(12) United States Patent
Beyer

(10) Patent No.: US 6,384,596 B1
(45) Date of Patent: May 7, 2002

(54) VARIABLE INDUCTANCE TRANSDUCER CIRCUIT PRODUCING AN ELECTRICAL CURRENT AND VOLTAGE OUTPUT

(76) Inventor: Douglas H. Beyer, 1408 Elizabeth Crest Dr., Redlands, CA (US) 92373

( * ) Notice: Subject to any disclaimer, the term of this patent is extended or adjusted under 35 U.S.C. 154(b) by 0 days.

(21) Appl. No.: 09/669,515

(22) Filed: Sep. 25, 2000

(51) Int. Cl.$^7$ .............................. G01B 7/14; G01R 27/26
(52) U.S. Cl. ........................... 324/207.16; 324/207.18; 324/207.26; 324/656; 331/65
(58) Field of Search .................... 324/207.15–207.19, 324/207.26, 234, 236, 654–657; 331/65; 340/870.31–870.36

(56) References Cited

U.S. PATENT DOCUMENTS

| | | | | |
|---|---|---|---|---|
| 3,973,191 A | * | 8/1976 | Zabler | 324/207.16 |
| 3,997,801 A | * | 12/1976 | Caron et al. | 331/65 X |
| 4,241,317 A | * | 12/1980 | Breitling | 331/65 |
| 4,527,121 A | * | 7/1985 | Fischer et al. | 324/207.16 X |
| 5,077,528 A | * | 12/1991 | Brosh | 324/207.16 X |
| 6,215,365 B1 | * | 4/2001 | Kurkovskiy | 331/65 |

* cited by examiner

Primary Examiner—Gerard R. Strecker
(74) Attorney, Agent, or Firm—Robert N. Schlesinger

(57) ABSTRACT

This Inductive Displacement Transducer relates to a new and useful set of embodiments for a comparator-type relaxation oscillator circuit where the frequency is controlled by variable inductance. Each oscillation of said circuit discharges a fixed amount of charge such that an increase in frequency increases the total current draw of the circuit.

17 Claims, 9 Drawing Sheets

US 6,384,596 B1

VARIABLE INDUCTANCE TRANSDUCER CIRCUIT PRODUCING AN ELECTRICAL CURRENT AND VOLTAGE OUTPUT

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

This invention, entitled Variable Inductance Transducer Circuit Producing an Electrical Current and Voltage Output, was devised and invented by Douglas H. Beyer, and relates to a new and useful type of displacement transducer that utilizes inductance changes in a transducer circuit to effect a transducer output signal, representing one or more of the following: a displacement measurement, a change in magnetic field permeability, a change in reluctance in a magnetic field, an inductance change in a deformable coil, an eddy current effect, a magnetic saturation, or other effects based on a change of inductance. Throughout this specification and its appended claims, the present invention will be referred to as the proper noun: "Inductive Displacement Transducer" or the "Transducer".

The term "transducer" as used throughout this specification and its appended claims is intended to refer to a device to convert a physical effect or property to a signal or the like, said signal generally being electrical, but may also be electromagnetic, e.g., radio frequency, microwave, optical, infrared or fiber optic.

The term "current" as used throughout this specification and its appended claims is intended to refer to either a pulsed or a time averaged current.

The term "circuit" as used throughout this specification and its appended claims is intended to refer to a complete circuit, or to a subset or subsection thereof, comprised of a device or set of devices, identified as performing specified functions.

The term "inductance" as used throughout this specification and its appended claims, is intended to refer to the property of a component to oppose a change in current, this property being related to the magnetic or electromagnetic field produced by the current.

The term "comparator" as used throughout this specification and its appended claims is also intended to refer to any equivalent device such as a differential voltage comparator, operational amplifier ("op-amp"), Schmitt trigger, differential transistor pair, one or more transistors referenced to a voltage that determines the "on" or "off" state(s).

FIELD OF THE INVENTION

This invention relates to the field of displacement transducers that are generally designed and manufactured by the sensor industry and have application in a variety of industries, such as medical electronics, electronic music, manufacturing and process control, hydraulic equipment, aircraft and vehicle industries.

DESCRIPTION OF THE RELATED ART INCLUDING INFORMATION DISCLOSED UNDER 37 CFR 1.97 AND 1.98

Heretofore, inductance type displacement transducers have largely used linear or rotary variable differential transformer means or a Hall effect detection of magnetic change, to convert a displacement or angular measurement to an electronic or electromagnetic signal. The inductance-based displacement transducers previous to the herein disclosed invention have been more expensive to manufacture and required more complex electronic circuitry to transduce a signal. Since sensors based on inductance change offer several potential advantages for high temperature operation, non-contacting measurement means, and tolerance to harsh environments, it is desirable to improve and simplify the electronics required to extract a useful signal from a change in inductance.

BRIEF SUMMARY OF THE INVENTION

In trying to solve the above-described transducer industry problems and disadvantages, and within the scope of this invention, the inventor, Douglas H. Beyer, has devised and invented a new and useful type of displacement transducer, that utilizes the disclosed evaluation circuit to realize the advantages of inductance-based displacement measurements. The advantages of the Inductive Displacement Transducer circuits disclosed herein follow. The Inductive Displacement Transducer may be designed to allow single or multiple inductance change measurement capability, as shown in FIG. 10. The Inductive Displacement Transducer may be utilized to affect broader media and environmental compatibility, and may be more easily adapted to equipment exposed to continuous use and to harsh environments. The Inductive Displacement Transducer is simpler in design, and may be manufactured at high quality control standards at a lower cost. The Inductive Displacement Transducer offers compatibility to a greater range of inductance values and inductor types, and therefore may be manufactured with a smaller size than transducers that are presently available, and this smaller size will permit the manufacture of more efficient devices, more portable devices, and less expensive transducer devices. The Inductive Displacement Transducer is easier to manufacture and to calibrate because both electrical and mechanical trim may be implemented to calibrate transducer output signals.

BRIEF DESCRIPTION OF THE SEVERAL VIEWS OF THE DRAWINGS

The schematic diagrams that follow show supply rails S1 and S2 such that either supply rail may be more positive that the other, and it is assumed that the embodiments of the electronic devices disclosed be connected to the proper polarity supply rail. In the detailed description of the invention, which follows, the supply rail S2 is referred to as the return rail S2, for illustrative purposes only, and said identification of S2 as a return rail should not thereby limit the extent of the invention disclosed or claimed.

DETAILED DESCRIPTION OF THE INVENTION

Figure 1:
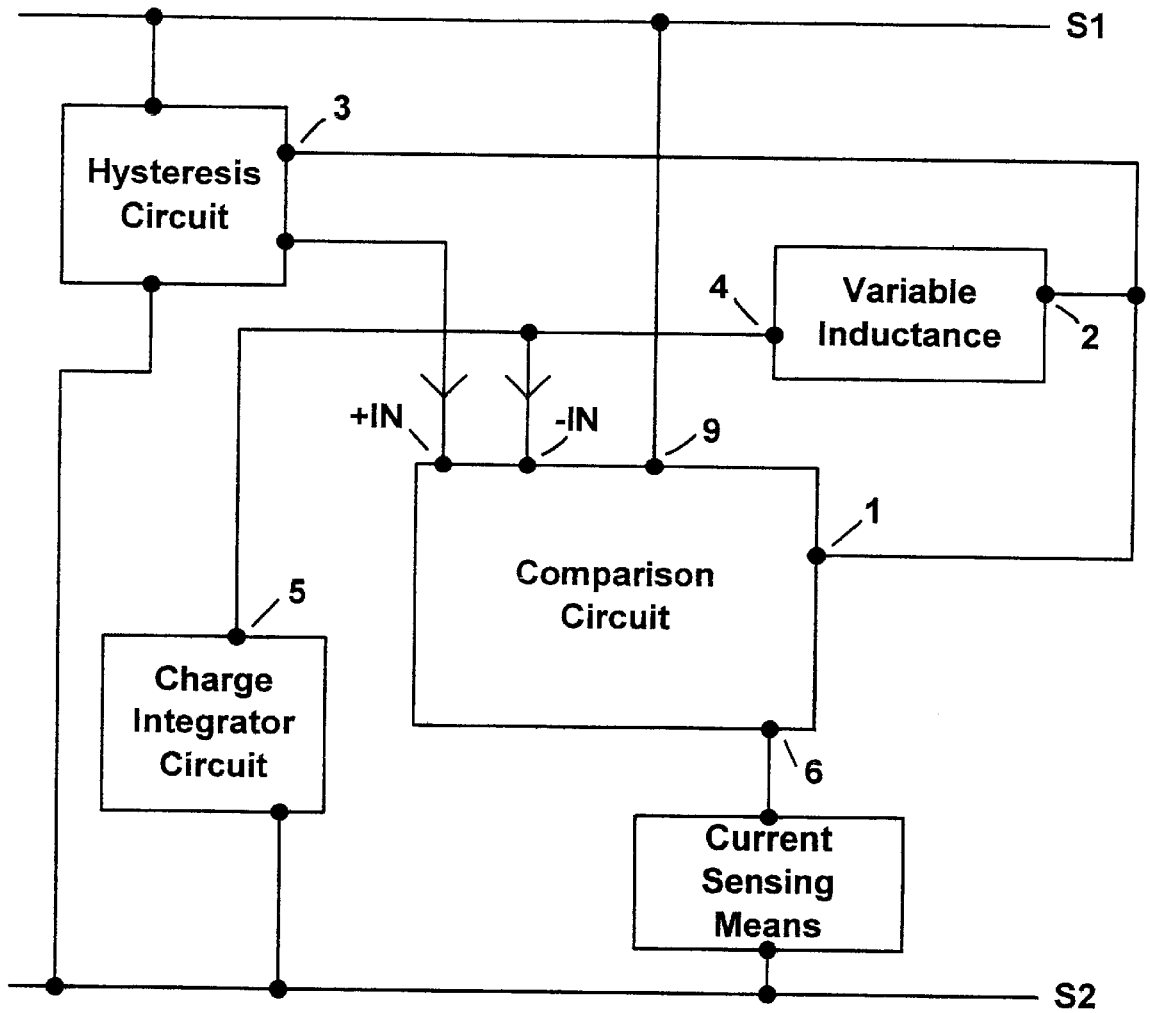
FIG. 1 shows a block diagram of a simple embodiment of the Inductive Displacement Transducer.

The operation of the simple embodiment of the Inductive Displacement Transducer, as shown in FIG. 1, utilizes a comparison means, such as the comparison circuit shown in FIG. 1, that has an output terminal (1), delivering a higher voltage level ("high") when the connection +IN has a higher voltage than −IN, and where the output voltage, at terminal (1) is a lower voltage ("low") when +IN is lower voltage than −IN. The comparison circuit output terminal (1) connects to a first inductance terminal (2) of the variable inductance and the comparison circuit output terminal (1) is also connected to a hysteresis circuit terminal (3) to affect the signal that the hysteresis circuit communicates to the comparator circuit input +IN. The function of the hysteresis circuit is to provide two voltage states, one voltage state being higher than the other voltage state to set upper and lower thresholds for the comparison input (+IN). The upper threshold corresponds to a "high" from the comparison circuit output terminal (1), while the lower threshold corresponds to a "low" at the output terminal (1). The inductive displacement transducer has a charge integrator circuit terminal (5) connected to both a second inductance terminal (4) of the variable inductance and connected to −IN of the comparison circuit. Current from the comparison circuit output terminal (1) flows through the variable inductance when this output is "high" to collect charge in the charge integrator circuit. When the voltage at the charge integrator terminal (5) is greater than +IN, the comparison circuit will change output state at the output terminal (1) to "low", thereby reversing the flow of current though the variable inductance. The voltage at the charge integrator terminal (5) decreases until the charge integrator terminal has a lower voltage than +IN. Now, the cycle repeats, with the comparison circuit's output terminal (1) returning to the "high" state. The repetition of cycles has a frequency related to the value of the inductance, and this frequency is also a useable transducer output signal, separately or in combination with the signal derived from the current sensing means, which is connected to a supply terminal (6) of the comparison circuit. A complete current path exits from supply rail S1, through the comparison circuit, and finally through the current sensing means to a second supply rail S2. A schematic diagram for the above disclosed simple embodiment of the Inductive Displacement Transducer is shown in FIG. 2.

Figure 2:
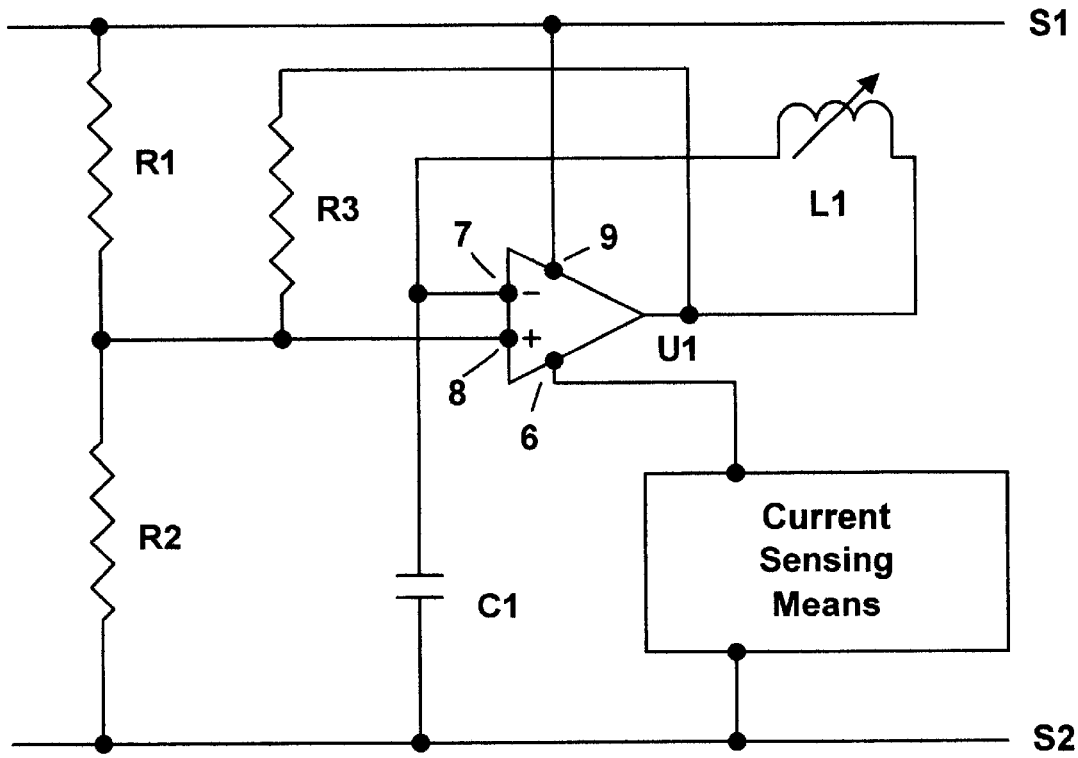
FIG. 2 shows a schematic diagram of a simple embodiment of the Inductive Displacement Transducer, and showing a singular inductance source.
Figure 3:
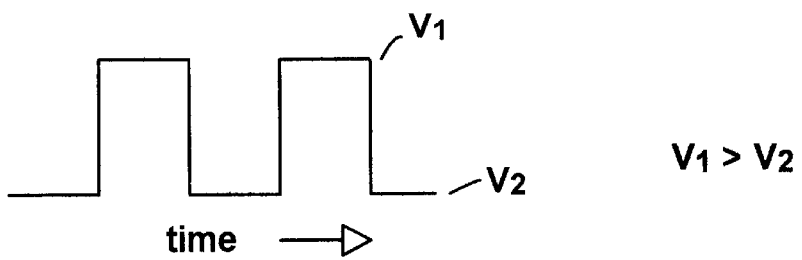
FIG. 3 shows a time-plot of the voltage threshold levels, as a function of time and such that the voltage $V_2$ level is greater than the voltage $V_2$ level. The purpose of this drawing figure is to illustrate the voltage at the hysteresis circuit, which sets the illustrate voltage threshold levels.
Figure 4:
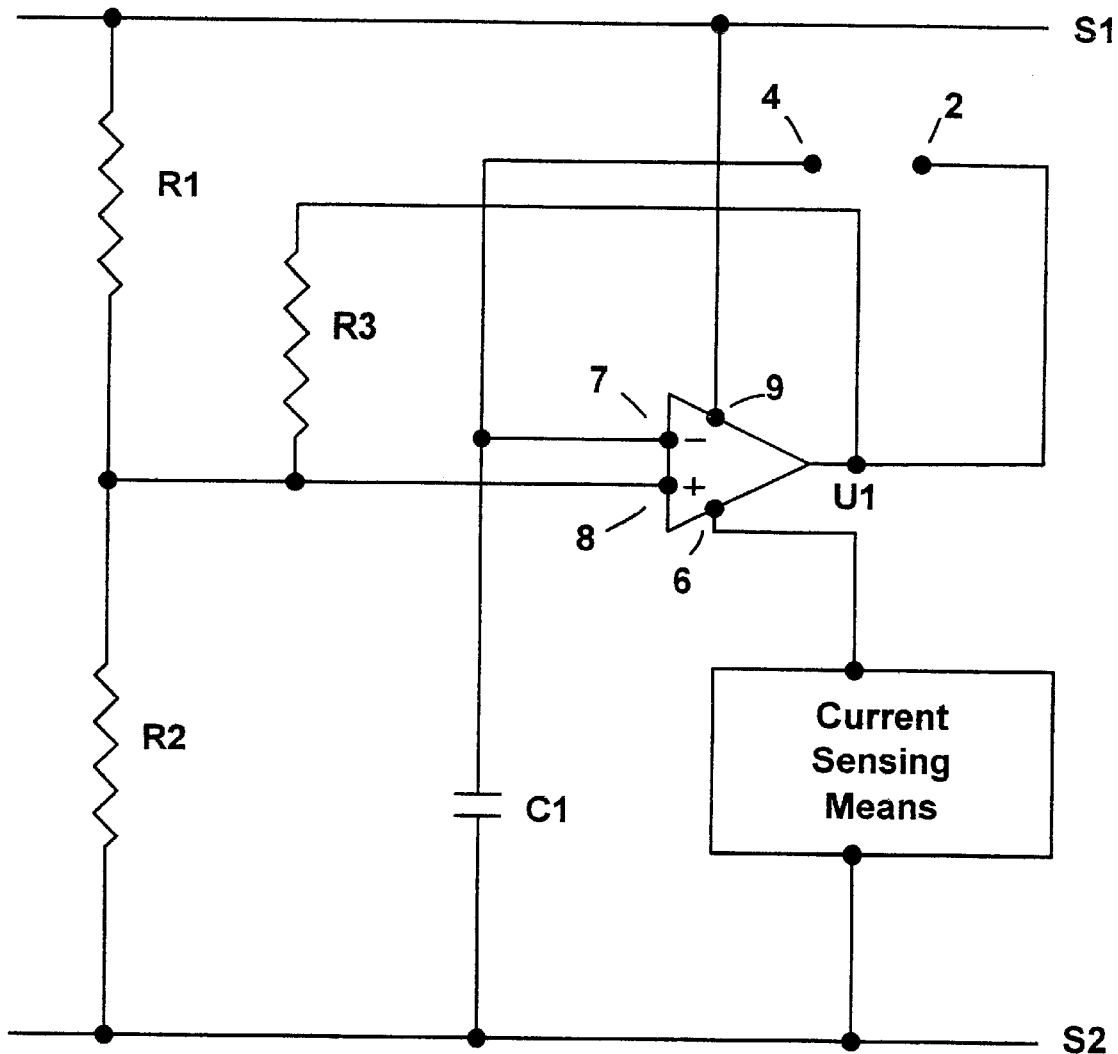
FIG. 4 shows a schematic a m of an evaluation circuit embodiment of the Inductive Displacement Transducer, and showing where a variable inductive device may be incorporated into the circuit between a first terminal (2) and a second terminal (4).
Figure 5:
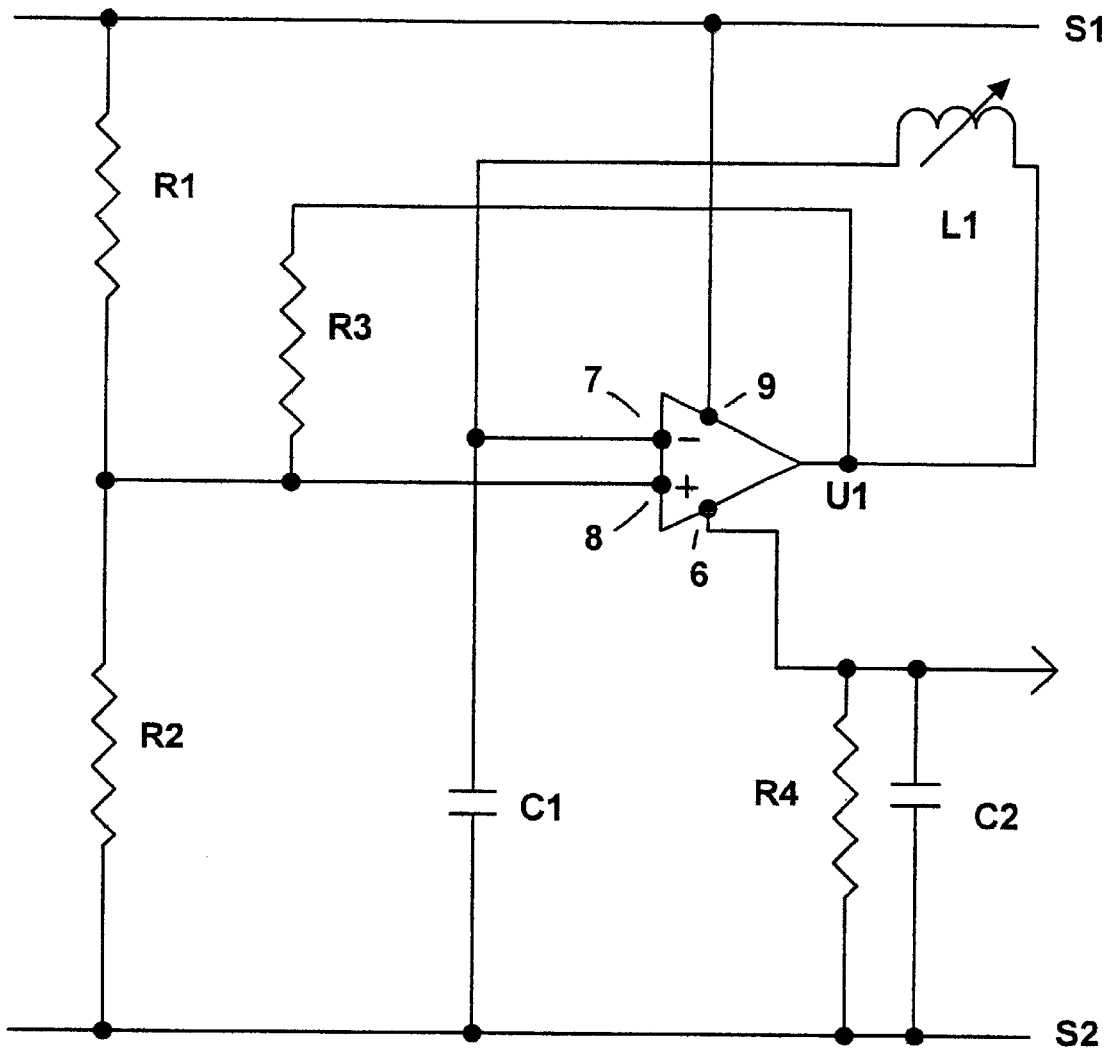
FIG. 5 shows a schematic diagram of a preferred embodiment of the inductive displacement transducer, and showing the use of a resistance, shown as R4 and C2, as the current sensing means.

FIG. 2 shows an implementation of FIG. 1. A simple embodiment implementation of FIG. 1 is described in the disclosure that follows. The hysteresis circuit shown in FIG. 1, is primarily comprised of resistors R1, R2, and R3, shown in FIG. 2. R3 may be eliminated for certain types of comparator devices that may be utilized in the disclosed circuits. R3 is shown in the embodiments disclosed in FIG. 2 and FIGS. 4 through 10, as an enabling disclosure for use with commonly available comparator devices. The variable inductance shown in FIG. 1, is comprised of inductance L1, shown in FIG. 2. The charge integrator circuit shown in FIG. 1, is comprised of capacitance C1, shown in FIG. 2. The comparison circuit shown in FIG. 1, is comprised of a voltage comparator device U1, shown in FIG. 2. The current sensing means shown in FIG. 1 may be a suitable meter as commonly used in the industry for measurement of current, and continues to be shown as a box in FIG. 2. An important principle of operation illustrated by FIG. 2 is the cyclical charging of C1 while the output of the comparator U1 is high. The capacitance C1 develops an increasing voltage at the comparator U1 input terminal (7), and this voltage increases until it reaches the upper threshold at the comparator U1 input terminal (8). This causes the comparator U1 to change output state to a "low". The "low" state at the output of comparator U1 produces the lower threshold in the hysteresis circuit, which is connected to the comparator U1 input terminal (8). Capacitance C1 now discharges a controlled amount of charge through inductance L1 to the comparator U1 output terminal, which is now "low", until this lower threshold is reached on C1, and initiates a repeat of the charging cycle. The amount of charge collected and discharged at capacitance C1 during each cycle is set by the threshold voltages $V_1$ and $V_2$, as shown and time-plotted in FIG. 3, where the charge can be calculated by the formula $1/2C(V_1)^2 - 1/2C(V_2)^2$, and where C is the value of the capacitance C1. The function of the variable inductance L1 is to act as an impedance to the current flow during the charging and subsequent discharge of C1. A variable frequency of repetition results from a change of inductance. During each full cycle of oscillation, described above, a given amount of charge is allowed to move through the inductance. When the oscillation frequency is higher the charge flow per unit of time is higher, thereby resulting in a larger current which can be measured between a supply rail S1 or S2, and one of the two supply terminals (9,6) of the comparator U1. One having ordinary skill in the art may use a variety of available means to take a measurement of the change in current. Such current sensing means may be accomplished by several means, such as the use of a resistance R4 producing a voltage output across R4, with capacitance, C2, as shown in FIG. 5 which is the preferred embodiment of the Inductive Displacement Transducer. Various types of impedance or resistance may be utilized for beneficial properties such as thermal behavior, noise filtering, a variable impedance, current transduction circuit, or the like. These impedance circuit or resistance options are means of accomplishing the current sensing means, shown in FIGS. 1, 2, 4, and FIGS. 6–10.

An evaluation circuit embodiment of the Inductive Displacement Transducer would be comprised essentially of the simple embodiment, as disclosed above and shown in FIGS. 1 and 2, except that the inductance L1 is to be incorporated into evaluation circuit at a later time, and with the inductive device selected by the manufacturer or user of the evaluation circuit embodiment of the Inductive Displacement Transducer. The inductance may be added to the evaluation circuit embodiment at the first terminal (2) and the second terminal (4), shown in FIG. 4.

Figure 6:
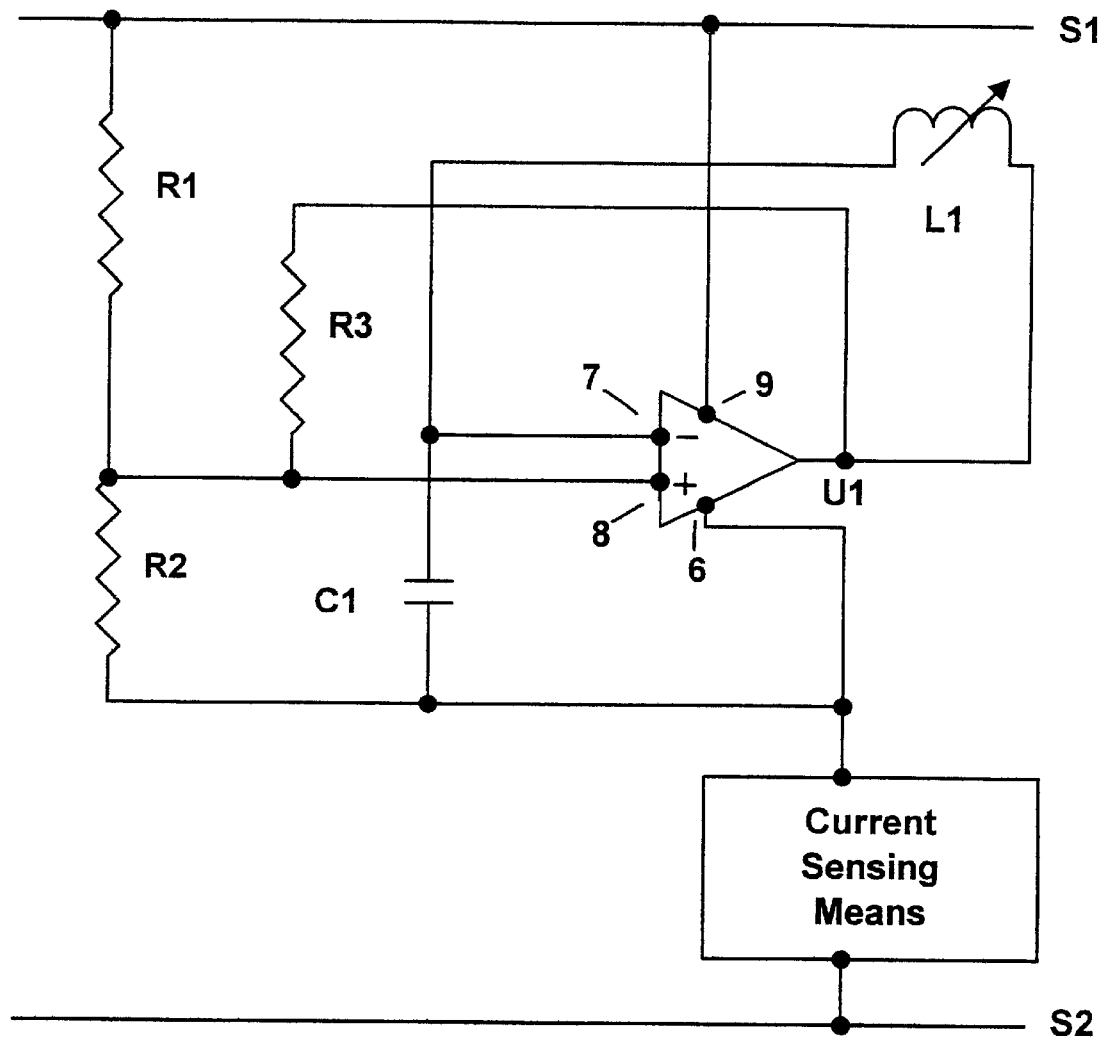
FIG. 6 shows a schematic diagram of a modified simple embodiment of the inductive displacement transducer, and showing a connection of the current sensing means that includes the current path of the hysteresis circuit and the charge integrator included into the current path of comparator to the return rail S2.
Figure 7:
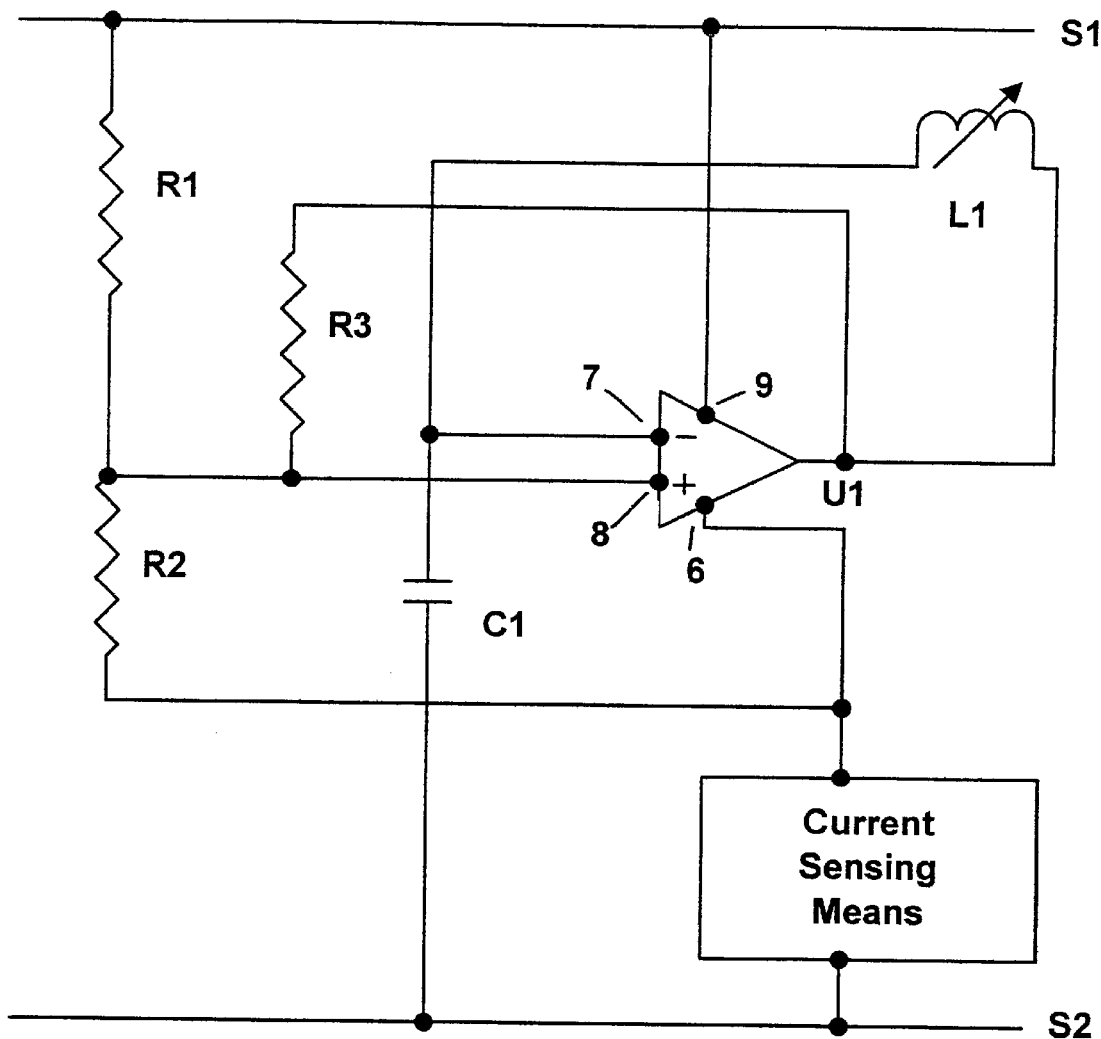
FIG. 7 shows a schematic diagram of a modified simple embodiment of the inductive displacement transducer, and showing a connection of the current sensing means that includes the current path of the hysteresis circuit into the current path of the comparator to the return rail S2.
Figure 8:
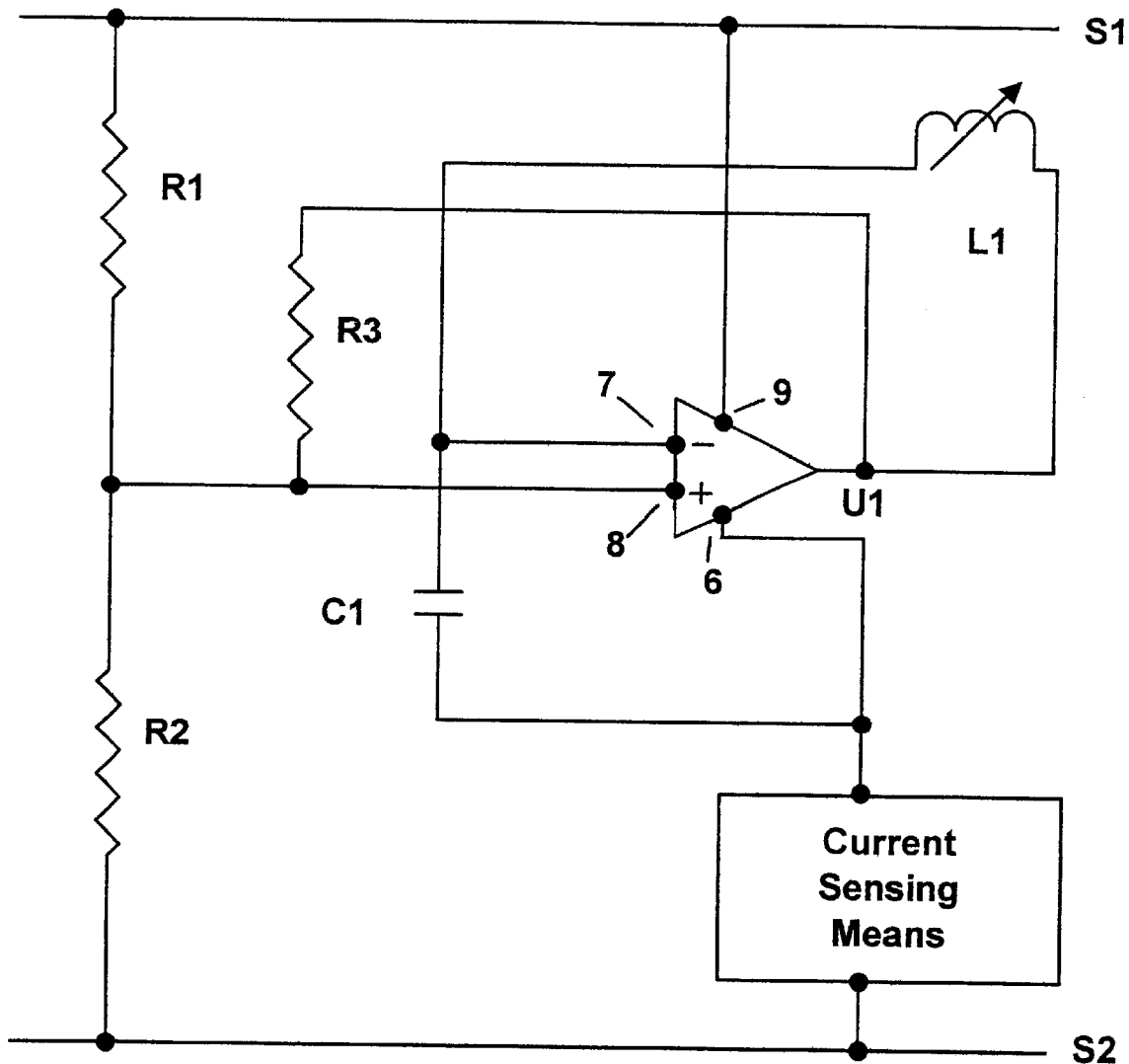
FIG. 8 shows a schematic diagram of a modified simple embodiment of the inductive displacement transducer, and showing a connection of the current sensing means that includes the current path of the charge integrator into the current path of the comparator to the return rail S2.

The current sensing means may alternatively be placed in series with either the supply rail S1 or the return rail S2, with a suitable choice of connection to the comparison circuit. The current path to the current sensing means may include the hysteresis circuit, as shown in FIG. 7, or the charge integrator, as shown in FIG. 8, or include both the hysteresis circuit and the charge integrator at a common junction (6), as shown in FIG. 6; FIGS. 6 through 8 are these modified simple embodiments.

A hybrid embodiment of the Inductive Displacement Transducer may utilize a plurality of the independent devices disclosed as simple, preferred, or modified embodiments, and as shown in FIGS. 1, 2, and 4–9. A simple example of this hybrid embodiment is shown in FIG. 10, and shows two of the simple embodiments of the Inductive Displacement Transducers coupled together or are adjacent to each other, such that their inductances are in proximity to each other, and able to respond to a common physical stimulus (10) or effect. Modified hybrid embodiments may utilize three or more independent devices, and such that the devices are arranged in differing spatial planes, to allow a more precise sensing from the common stimulus (10) or effect. In these hybrid embodiments, the independent devices utilize common supply rails S1 and S2, and may utilize a common current sensing means, as shown in FIG. 10, or a separate current sensing means for each of the two analogous Transducer Circuits shown.

Figure 9:
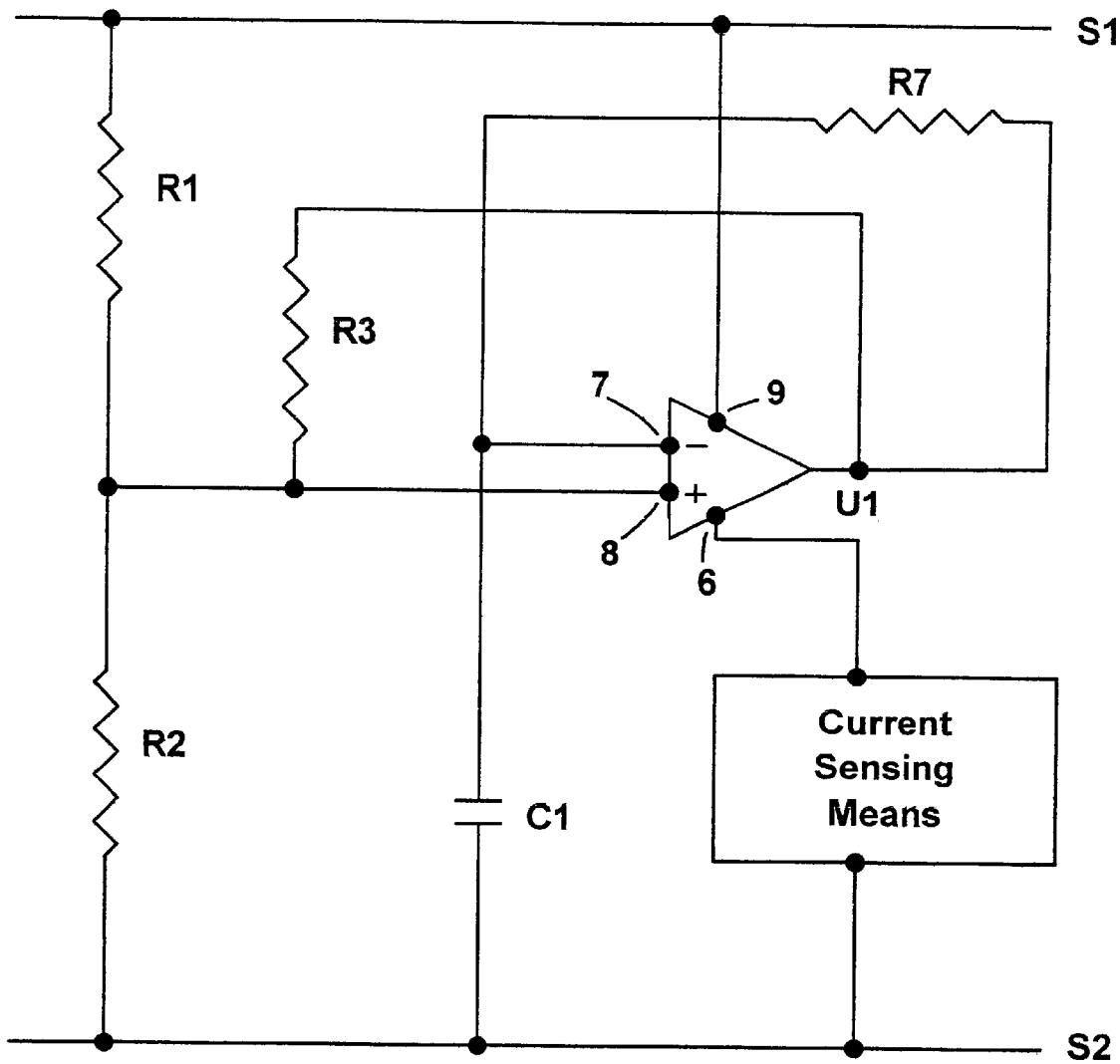
FIG. 9 shows a schematic diagram of an alternative embodiment of the inductive displacement transducer configured to function as a "dummy circuit".
Figure 10:
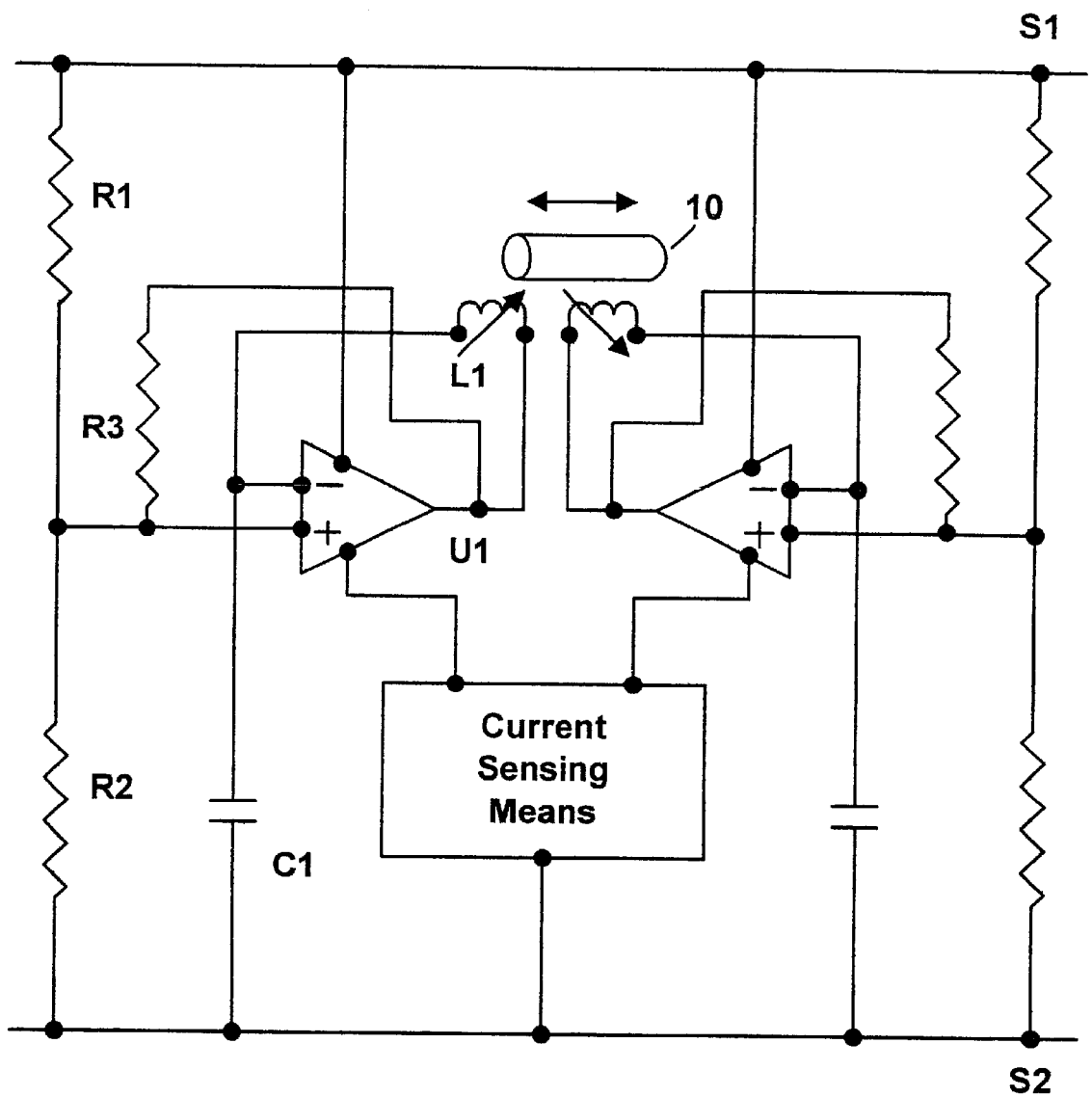
FIG. 10 shows a schematic diagram of a hybrid simple embodiment of the inductive displacement transducer, and showing two inductance sources.

A schematic diagram of a reference or "dummy" circuit embodiment of the Inductive Displacement Transducer is shown in FIG. 9. In this "dummy" circuit embodiment, a fixed resistance R7 replaces the inductance L1, said inductance shown in FIG. 2. Any change that is an effect independent of an inductance in an active transducer that is in proximity to the present "dummy" embodiment, may be accounted for and the appropriate adjustment may be made. Such independent effects may include thermal or climatological effects, electromagnetic interference ("EMI"), vibration or flutter, supply voltage variations and perturbations, or a combination thereof.

I claim:

1. A Transducer, comprised essentially of:
   a. a variable inductance having a first variable inductance terminal and a second variable inductance terminal;
   b. a comparison circuit, having a first supply terminal connected to a first supply rail, and having an output terminal connected to said first variable inductance terminal;
   c. a hysteresis circuit, having a first hysteresis terminal connected to said output terminal of said comparison circuit;
   d. a charge integrator circuit, having a first charge integrator terminal connected to said second variable inductance terminal, and said first charge integrator terminal is also connected to a first input of the comparison circuit;
   e. a second charge integrator terminal is connected to a second supply rail and a second hysteresis terminal is connected to a voltage referenced to said supply rails, and said second hysteresis terminal is also connected to a second input of said comparison circuit; and
   f. a current sensing means, producing a transducer output, and having a first sensing means terminal connected to a second supply terminal of the comparison circuit, and a second sensing means terminal connected to the second supply rail.

2. A Transducer, as recited in claim 1, and further comprised essentially of a resistance as said current sensing means and wherein a voltage output is obtained at said second supply terminal of said comparison circuit.

3. A Transducer, as recited in claim 2, and further comprised essentially of a capacitance in parallel to said resistance.

4. A Hybrid Transducer comprised essentially of a first Transducer, as recited in claim 1, placed adjacent to a second Transducer, as recited in claim 1, such that a variable inductance from said first Transducer, is in proximity of a variable inductance from said second Transducer.

5. A Hybrid Transducer, as recited in claim 4, and further comprised essentially of said variable inductance from the first Transducer and said variable inductance from the second Transducer respond to a common physical stimulus.

6. A Transducer, comprised essentially of:
   a. a variable inductance having a first variable inductance terminal and a second variable inductance terminal;
   b. a comparison circuit, having a first supply terminal connected to a first supply rail, and having an output terminal connected to said first variable inductance terminal;
   c. a hysteresis circuit, having a first hysteresis terminal connected to said output terminal of said comparison circuit;
   d. a charge integrator circuit, having a first charge integrator terminal connected to said second variable inductance terminal, and said first charge integrator terminal is also connected to a first input of the comparison circuit;
   e. a second charge integrator terminal is connected to a second supply rail and a second hysteresis terminal is connected to a voltage referenced to said supply rails, and said second hysteresis terminal is also connected to a second input of said comparison circuit; and
   f. a current sensing means comprised essentially of a parallel resistance and capacitance circuit having a first sensing means terminal connected to a second supply terminal of the comparison circuit, and having a second sensing means terminal connected to the second supply rail.

7. A Transducer, as recited in claim 6, and further comprised essentially of said second charge integrator terminal connected to said second supply terminal of said comparison circuit, in place of connection to said second supply rail.

8. A Transducer, as recited in claim 6, and further comprised essentially of the second hysteresis terminal referenced to said second supply terminal of said comparison circuit, in place of reference to said second supply rail.

9. A dummy Transducer, comprised essentially of:
   a. a fixed resistance having a first impedance terminal and a second impedance terminal;

b. a comparison circuit, having a first supply terminal connected to a first supply rail, and having an output terminal connected to said first impedance terminal;

c. a hysteresis circuit, having a first hysteresis terminal connected to said output terminal of said comparison circuit;

d. a charge integrator circuit, having a first charge integrator terminal connected to said second impedance terminal, and said first charge integrator terminal is also connected to a first input of the comparison circuit;

e. a second charge integrator terminal is connected to a second supply rail and a second hysteresis terminal is connected to a voltage referenced to said supply rails, and said second hysteresis terminal is also connected to a second input of said comparison circuit; and f. a current sensing means having a first sensing means terminal and a second sensing means terminal, said first sensing means terminal is connected to a second supply terminal of the comparison circuit, and said second sensing means terminal is connected to the second supply rail.

10. A Transducer, as recited in claim 9, and further comprised essentially of a resistance as said current sensing means.

11. A Transducer, as recited in claim 10, and further comprised essentially of a capacitance in parallel to said resistance.

12. A Transducer comprised essentially of:

a. a first variable inductance terminal and a second variable inductance terminal;

b. a comparison circuit, having a first supply terminal connected to a first supply rail, and having an output terminal connected to said first variable inductance terminal;

c. a hysteresis circuit, having a first hysteresis terminal connected to said output terminal of said comparison circuit;

d. a charge integrator circuit, having a first charge integrator terminal connected to said second variable inductance terminal, and said first charge integrator terminal is also connected to a first input of the comparison circuit;

e. a second charge integrator terminal is connected to a second supply rail and a second hysteresis terminal is connected to a voltage referenced to said supply rails, and said second hysteresis terminal is also connected to a second input of said comparison circuit; and f. a current sensing means having a first sensing means terminal and a second sensing means terminal, said first sensing means terminal is connected to a second supply terminal of the comparison circuit, and said second sensing means terminal is connected to the second supply rail.

13. A Transducer, as recited in claim 12, and further comprised essentially of a remotely connected variable inductance connected to the first variable inductance terminal and connected to the second variable inductance terminal.

14. A Transducer, as recited in claim 12, and further comprised essentially of a capacitance in parallel to a resistance, as said current sensing means.

15. A Transducer, as recited in claim 12, and further comprised essentially of an impedance circuit, as said current sensing means.

16. A Transducer, as recited in claim 12, and further comprised essentially of a current transduction circuit, as said current sensing means.

17. A Transducer, as recited in claim 1, and further comprised essentially of a current transduction circuit, as said current sensing means.

* * * * *